US010826909B2

(12) United States Patent
O'Connell et al.

(10) Patent No.: US 10,826,909 B2
(45) Date of Patent: Nov. 3, 2020

(54) PLATFORM-BASED AUTHENTICATION FOR EXTERNAL SERVICES (71) Applicant: ServiceNow, Inc., Santa Clara, CA (US)

(72) Inventors: Jerome Daniel O'Connell, Crystal, MN (US); John H. Kim, Santa Clara, CA (US); Subbaraya Kumar Deverakonda Venkata, Milpitas, CA (US); Kai Xu, San Jose, CA (US)

(73) Assignee: ServiceNow, Inc., Santa Clara, CA (US)

(*) Notice: Subject to any disclaimer, the term of this patent is extended or adjusted under 35 U.S.C. 154(b) by 219 days.

(21) Appl. No.: 16/151,779

(22) Filed: Oct. 4, 2018

(65) Prior Publication Data

US 2020/0112565 A1 Apr. 9, 2020

(51) Int. Cl.
H04L 29/06 (2006.01)
(52) U.S. Cl.
CPC .......... H04L 63/102 (2013.01); H04L 63/101 (2013.01); H04L 63/108 (2013.01)
(58) Field of Classification Search
CPC ... H04L 63/102; H04L 63/108; H04L 63/101; H04L 63/0846; H04L 67/10
See application file for complete search history.

(56) References Cited

U.S. PATENT DOCUMENTS

| 6,678,887 | B1 | 1/2004 | Hallman |
| 7,020,706 | B2 | 3/2006 | Cates |
| 7,716,353 | B2 | 5/2010 | Golovinsky |
| 7,769,718 | B2 | 8/2010 | Murley |
| 7,925,981 | B2* | 4/2011 | Pourheidari ............ H04L 67/02 715/744 |
| 8,402,127 | B2 | 3/2013 | Solin |
| 8,612,408 | B2 | 12/2013 | Trinon |
| 8,832,652 | B2 | 9/2014 | Mueller et al. |
| 9,065,783 | B2 | 6/2015 | Ding |
| 9,098,322 | B2 | 8/2015 | Apte |
| 9,122,552 | B2* | 9/2015 | Whitney ................... G06F 8/61 |
| 9,253,183 | B2* | 2/2016 | Nathan ................... H04L 63/08 |
| 9,317,327 | B2 | 4/2016 | Apte |
| 9,363,252 | B2 | 6/2016 | Mueller |
| 9,535,737 | B2 | 1/2017 | Joy |
| 9,557,969 | B2 | 1/2017 | Sharma |

(Continued)

Primary Examiner — Khoi V Le
(74) Attorney, Agent, or Firm — Fletcher Yoder PC (57) ABSTRACT Providing access to an external application includes receiving login credentials to access a client instance, wherein the login credentials are associated with a user account, causing the client instance to provide a link to an external application in the client instance, detecting a request to navigate to the external application from the link, generating a authentication record for the user account and the external application, storing information for the user account based on the authentication record, and generating a URL for the external application based on the authentication record. Providing access to the external application also includes receiving, from a remote client device hosting the external application, an authorization request comprising nonce information, determining that the user account is authorized to access the external application based on the authentication table, and providing access to the external application.

20 Claims, 7 Drawing Sheets (56) References Cited

U.S. PATENT DOCUMENTS

| | | | |
|---|---|---|---|
| 9,645,833 B2 | 5/2017 | Mueller | |
| 9,654,473 B2 | 5/2017 | Miller | |
| 9,766,935 B2 | 9/2017 | Kelkar | |
| 9,774,581 B2 | 9/2017 | Leicher et al. | |
| 9,805,322 B2 | 10/2017 | Kelkar | |
| 2016/0094531 A1 | 3/2016 | Unnikrishnan et al. | |
| 2017/0346851 A1* | 11/2017 | Drake | H04W 12/02 |
| 2017/0374070 A1* | 12/2017 | Shah | H04L 63/105 |

* cited by examiner

| USER_ID | APPLICATION | NONCE | ORIGINATION | EXPIRATION | URL | Usage | Validity |
|---|---|---|---|---|---|---|---|
| User_A | Application A | ODX293Fc8 | 1:14:56 | 4:14:56 | https://AppA.firstcustomer.com/index.php?usrid=User_A&ncode=ODX293Fc8 | Y | N |
| User_A | Application B | e15IF9c83 | 1:35:16 | 4:35:16 | https://AppB.firstcustomer.com/index.php?usrid=User_A&ncode=e15IF9c83 | N | N |
| User_B | Application C | 933FXe2D8 | 2:15:36 | 6:15:36 | https://AppC.firstcustomer.com/index.php?usrid=User_B&ncode=ODX293Fc8 | Y | N |
| User_C | Application A | f770bc10d | 11:20:33 | 14:20:33 | https://AppA.firstcustomer.com/index.php?usrid=User_C&ncode=f770bc10d | Y | N |
| User_D | Application D | 8004F3ec7 | 11:53:15 | 14:53:15 | https://AppD.firstcustomer.com/index.php?usrid=User_D&ncode=8004F3ec7 | N | Y |

PLATFORM-BASED AUTHENTICATION FOR EXTERNAL SERVICES

TECHNICAL FIELD

Embodiments described herein generally relate to user authentication, and more particularly, to providing authentication to access remote applications stored on a remote client device from within a client instance by utilizing nonce values.

BACKGROUND

A variety of enterprise and/or information technology (IT) related software applications may be utilized to support various functions of an enterprise such as Finance, Human Resource (HR), IT, Legal, Marketing, Sales, and the like. The software applications may be deployed on an instance platform on a server and accessed as needed over a network such as a Local Area Network (LAN) or the Internet. The server may be a local enterprise server as part of a self-hosted system or a remote server located in the Cloud as part of a cloud computing system.

Cloud computing relates to sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or IT related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment a method includes: receiving login credentials to access a client instance, wherein the login credentials are associated with a user account, causing the client instance to provide a link to an external application in the client instance, detecting a request to navigate to the external application from the link, generating a authentication record for the user account and the external application, storing information for the user account based on the authentication record, and generating a URL for the external application based on the authentication record. The method also includes receiving, from a remote client device hosting the external application, an authorization request comprising nonce information, determining that the user account is authorized to access the external application based on the authentication table, and providing access to the external application.

In another embodiment, the method may be embodied in computer executable program code and stored in a non-transitory storage device. In yet another embodiment, the method may be implemented on a (cloud-based or self-hosted) computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 6 shows an example authentication table 600, according to one or more embodiments.

DESCRIPTION OF EMBODIMENTS

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other embodiments, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine hosted on one of more physical devices, virtual container hosted on one or more physical devices, host, server, laptop, tablet, and/or mobile device or to a plurality of electronic computing devices working together to perform the function described as being performed on or by the computing system.

As used herein, the term "medium" or "memory" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system or one or more hardware processors. Example embodiments of an application include software modules, software objects, software instances and/or other types of executable code.

This disclosure relates to providing authorized access to an external application from within a client instance. More specifically, a user may utilize login credentials for a client instance to access a remote application by taking advantage of a nonce value generated and stored by the client instance. As an example, a user may log in to the client instance using a user name and password, or other identifying information, such as biometric information or the like. Once a user is within an authenticated session of the client instance, the client instance may provide a list of external applications that may be accessed from the client instance. That is, the client instance may indicate applications external to the client instance that may be accessed from within the client instance. A user may request access to one of the external applications, for example, by clicking on a link to one of the external applications. In response to detecting the selection of an external application, such as by detecting a selection of a link to the external application, an authentication record is generated for the user account and the external application. For example, the authentication record may include a nonce value that is linked with the user account, which was authenticated during the login process for the client instance, as well as the selected external application. In one or more embodiments, the authentication record may be stored in an authentication table, which may provide an indication of the validity of authentication records for one or more user accounts. The system may also generate a URL for the external application based on the authentication record.

An authorization request may be received by an authentication module hosted on a platform from the remote client device, which may include nonce information from the authentication record. The system may determine that the user account is authorized to access the external application based on the authentication table. In response to determining that the user account is authorized, access to the external application may be provided. For example, a browser window in which the client instance is provided may be redirected to present the external application. According to one or more embodiments, the system provides secure authentication because a user must be authenticated into a client instance prior to requesting access to a remote application, and the access to the remote application is governed via managing authentication information for a user by a dynamically generated nonce value, for which expiration information may be controlled.

Figure 1:
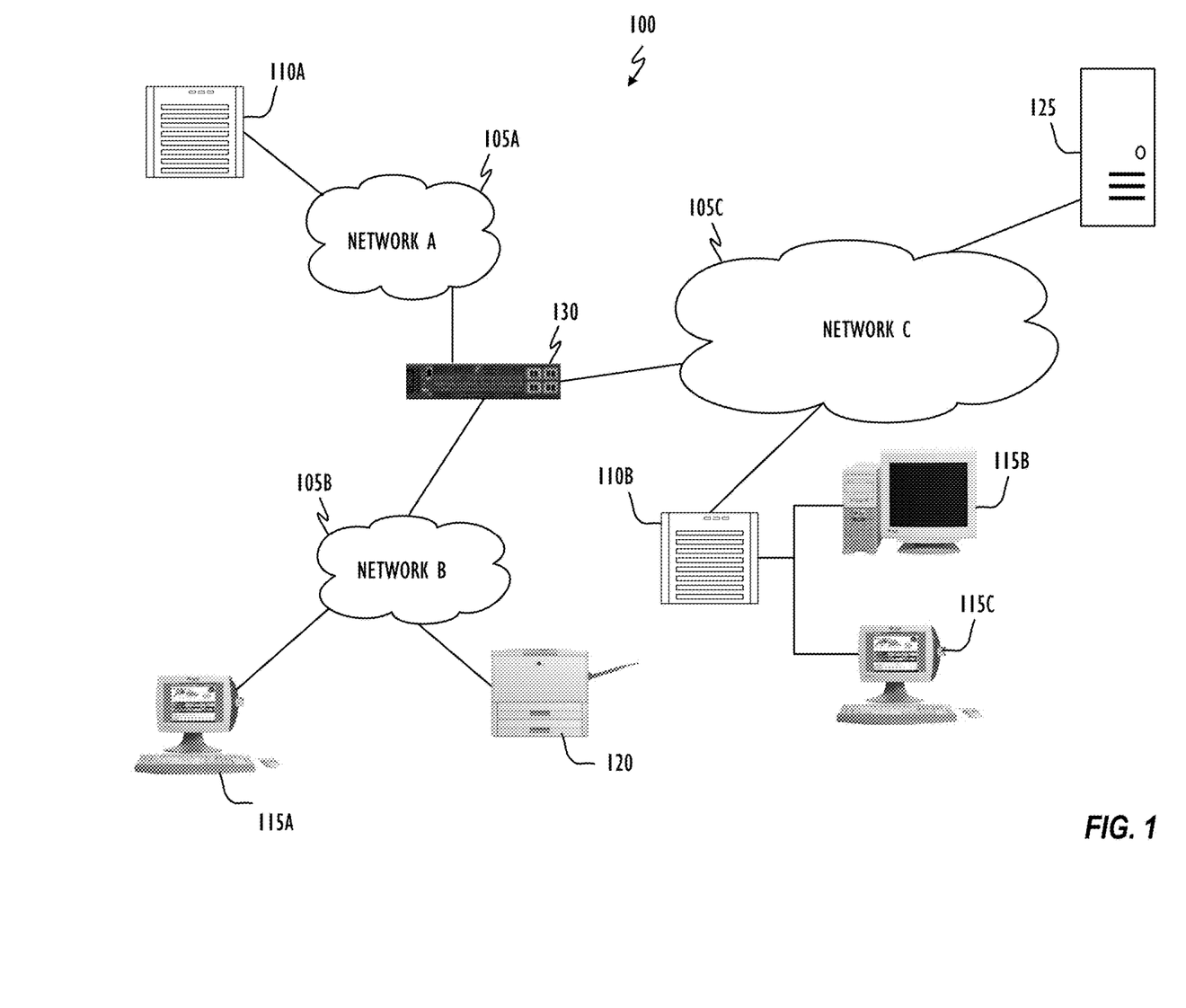
FIG. 1 illustrates a block diagram of self-hosted network system 100 where one or more embodiments of the present disclosure may operate.

FIG. 1 depicts an illustrative self-hosted network system 100 where one or more embodiments of the present disclosure may operate. This illustrative network system 100 may include a plurality of networks 105, (i.e., 105A, 105B, and 105C), each of which may take any form including, but not limited to, a local area network (LAN) or a WAN, such as the Internet. Further, networks 105 may use any desired technology (wired, wireless, or a combination thereof) and protocol (e.g., transmission control protocol, TCP). Coupled to networks 105 are data server computers 110 (i.e., 110A and 110B) that are capable of operating server applications such as databases and also capable of communicating over networks 105. One embodiment using server computers may involve the operation of one or more central systems to log user session data and identify session signatures of the user session.

Client computers 115 (i.e., 115A, 115B, and 115C), which may take the form of any smartphone, gaming system, tablet, computer, set top box, entertainment device/system, television, telephone, communications device, or intelligent machine, including embedded systems, may also be coupled to networks 105, and/or data server computers 110. In some embodiments, network system 100 may also include network printers such as printer 120 and storage systems such as 125, which may be used to store user session data or other data that are referenced herein. To facilitate communication between different network devices (e.g., data servers 110, end-user computers 115, network printer 120, and storage system 125), at least one gateway or router 130 may be optionally coupled there between. Furthermore, to facilitate such communication, each device employing the network may comprise a network adapter circuit and related software. For example, if an Ethernet network is desired for communication, each participating device must have an Ethernet adapter or embedded Ethernet capable ICs. Further, the devices may carry network adapters for any network in which they might participate (including, but not limited to, personal area networks (PANs), LANs, WANs, and cellular networks).

Figure 2:
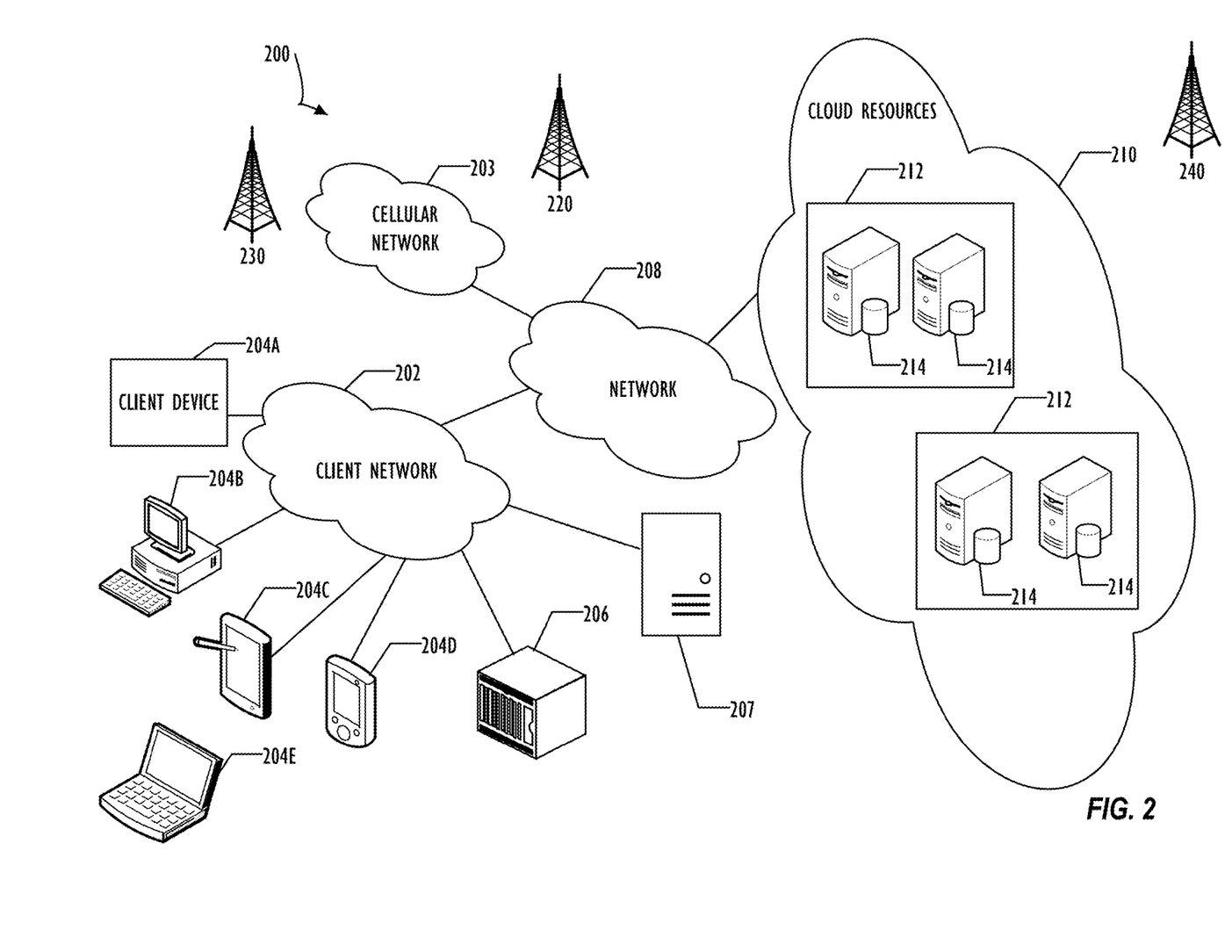
FIG. 2 illustrates a block diagram of cloud computing infrastructure 200 where one or more embodiments of the present disclosure may operate.

FIG. 2 illustrates a block diagram of an embodiment of a cloud computing infrastructure 200 where one or more embodiments of the present disclosure may operate. Cloud computing infrastructure 200 comprises a client network 202, network 208, and a cloud resources platform/network 210. In one embodiment, the client network 202 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 202 represents an enterprise network that could include or be communicatively coupled to one or more local area networks (LANs), virtual networks, data centers and/or other remote networks (e.g., 208, 210). As shown in FIG. 2, client network 202 may be connected to one or more client devices 204A-E and allow the client devices to communicate with each other and/or with cloud resources platform/network 210. Client devices 204A-E may be computing systems such as desktop computer 204B, tablet computer 204C, mobile phone 204D, laptop computer (shown as wireless) 204E, and/or other types of computing systems generically shown as client device 204A. Each of client devices 204A-E may be similar to any of client computers 115 of network system 100 shown in FIG. 1. FIG. 2 also illustrates that client network 202 may be connected to a local compute resource 206 that may include a server, access point, router, or other device configured to provide for local computational resources and/or to facilitate communication amongst networks and devices. For example, local compute resource 206 may be one or more physical local hardware devices configured to communicate with wireless network devices and/or facilitate communication of data between client network 202 and other networks such as network 208 and cloud resources platform/network 210. Local compute resource 206 may also facilitate communication between other external applications, data sources, and services, and client network 202.

FIG. 2 also illustrates that client network 202 may be connected to a computer configured to execute a management, instrumentation, and discovery (MID) server 207. For example, MID server 207 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 207 may be configured to assist functions such as, but not necessarily limited to, discovery, orchestration, service mapping, service analytics, and event management. MID server 207 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 200 also includes cellular network 203 for use with mobile communication devices. Mobile cellular networks support mobile phones and many other types of mobile devices such as laptops etc. Mobile devices in cloud computing infrastructure 200 are illustrated as mobile phone 204D, laptop 204E, and tablet 204C. A mobile device such as mobile phone 204D may interact with one or more mobile provider networks as the mobile device moves, typically interacting with a plurality of mobile network towers 220, 230, and 240 for connecting to the cellular network 203. Although referred to as a cellular network in FIG. 2, a mobile device may interact with towers of more than one provider network, as well as with multiple non-cellular devices such as wireless access points and routers (e.g., local compute resource 206). In addition, the mobile devices may interact with other mobile devices or with non-mobile devices such as desktop computer 204B and various types of client device 204A for desired services. Although not specifically illustrated in FIG. 2, client network 202 may also include a dedicated network device (e.g., gateway or router) or a combination of network devices that implement a customer firewall or intrusion protection system.

FIG. 2 illustrates that client network 202 is coupled to a network 208. Network 208 may include one or more computing networks, such as other LANs, wide area networks (WANs), the Internet, and/or other remote networks, to transfer data between client devices 204A-E and cloud resources platform/network 210. Each of the computing networks within network 208 may contain wired and/or wireless programmable devices that operate in the electrical and/or optical domain. For example, network 208 may include wireless networks, such as cellular networks in addition to cellular network 203. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 208 may also employ any number of network communication protocols, such as Transmission Control Protocol (TCP) and Internet Protocol (IP). Although not explicitly shown in FIG. 2, network 208 may include a variety of network devices, such as servers, routers, network switches, and/or other network hardware devices configured to transport data over networks.

In FIG. 2, cloud resources platform/network 210 is illustrated as a remote network (e.g., a cloud network) that is able to communicate with client devices 204A-E via client network 202 and network 208. The cloud resources platform/network 210 acts as a platform that provides additional computing resources to the client devices 204A-E and/or client network 202. For example, by utilizing the cloud resources platform/network 210, users of client devices 204A-E may be able to build and execute applications, such as automated processes for various enterprise, IT, field service and/or other organization-related functions. In one embodiment, the cloud resources platform/network 210 includes one or more data centers 212, where each data center 212 could correspond to a different geographic location. Within a particular data center 212 a cloud service provider may include a plurality of server instances 214. Each server instance 214 may be implemented on a physical computing system, such as a single electronic computing device (e.g., a single physical hardware server) or could be in the form of a multi-computing device (e.g., multiple physical hardware servers). Examples of server instances 214 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 210, network operators may choose to configure data centers 212 using a variety of computing infrastructures. In one embodiment, one or more of data centers 212 are configured using a multi-tenant cloud architecture such that a single server instance 214, which can also be referred to as an application instance, handles requests and serves more than one customer. In some cases, data centers with multi-tenant cloud architecture commingle and store data from multiple customers, where multiple client instances are assigned to a single server instance 214. In a multi-tenant cloud architecture, the single server instance 214 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 214 causing outages for all customers allocated to the single server instance 214.

In another embodiment, one or more of the data centers 212 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 214 and/or other combinations of server instances 214, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 210, and customer-driven upgrade schedules. An example of implementing a client instance within a multi-instance cloud architecture will be discussed in more detail below when describing FIG. 3.

Figure 3:
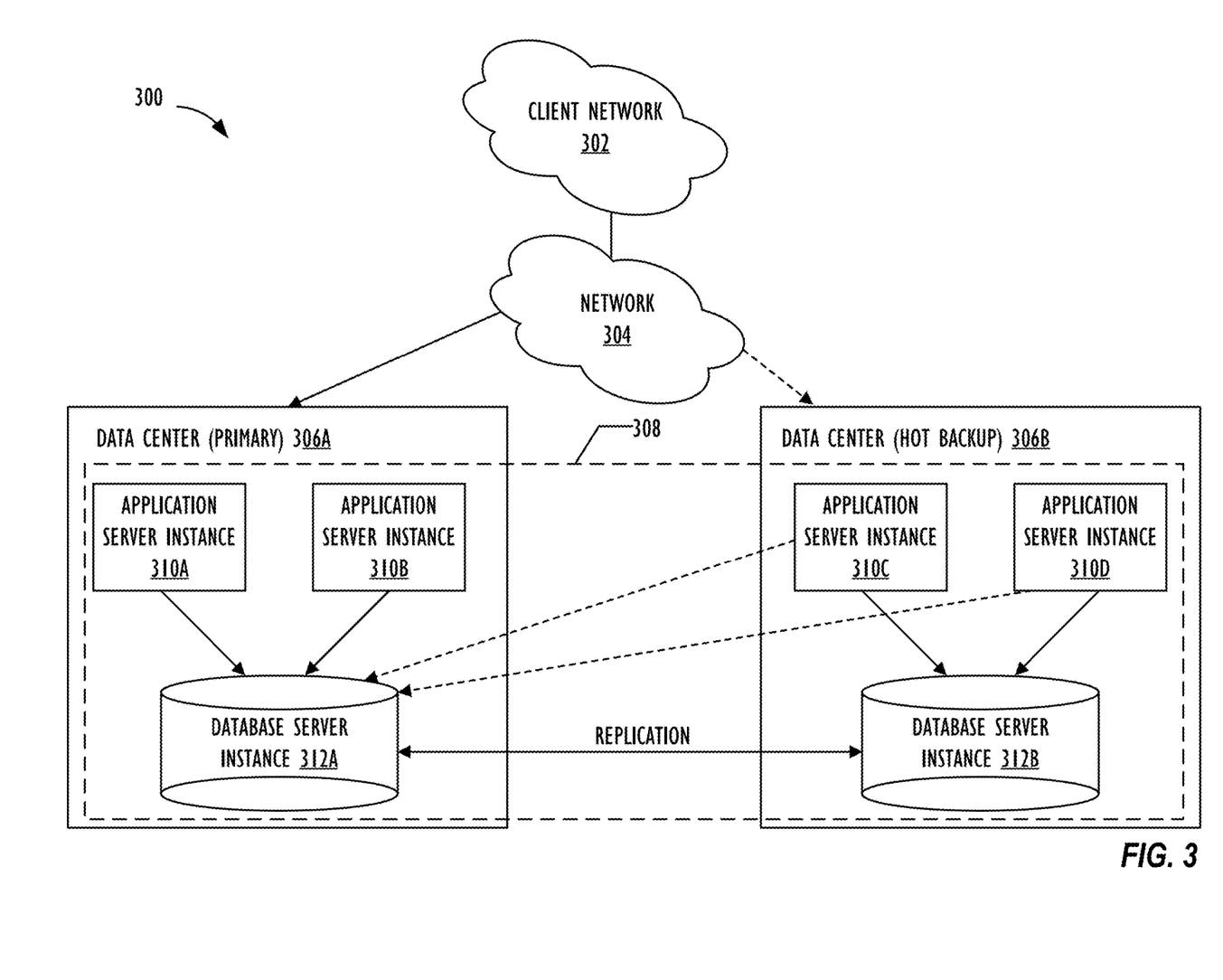
FIG. 3 illustrates a block diagram of multi-instance cloud architecture 300 where one or more embodiments of the present disclosure may operate.

In one embodiment, utilizing a multi-instance cloud architecture, a first client instance may be configured with a client side application interface such as, for example, a web browser executing on a client device (e.g., one of client devices 204A-E of FIG. 2). FIG. 3 illustrates a block diagram of an embodiment of a multi-instance cloud architecture 300 where embodiments of the present disclosure may operate. FIG. 3 illustrates that the multi-instance cloud architecture 300 includes a client network 302 that connects to two data centers 306A and 306B via network 304. Client network 302 and network 304 may be substantially similar to client network 302 and network 208 as described in FIG. 2, respectively. Data centers 306A and 306B can correspond to FIG. 2's data centers 212 located within cloud resources platform/network 210. Using FIG. 3 as an example, a client instance 308 is composed of four dedicated application server instances 310A-310D and two dedicated database server instances 312A and 312B. Stated another way, the application server instances 310A-310D and database server instances 312A and 312B are not shared with other client instances 308. Other embodiments of multi-instance cloud architecture 300 could include other types of dedicated server instances, such as a web server instance. For example, client instance 308 could include the four dedicated application server instances 310A-310D, two dedicated database server instances 312A and 312B, and four dedicated web server instances (not shown in FIG. 3).

To facilitate higher availability of client instance 308, application server instances 310A-310D and database server instances 312A and 312B are shown to be allocated to two different data centers 306A and 306B, where one of data centers 306 may act as a backup data center. In reference to FIG. 3, data center 306A acts as a primary data center that includes a primary pair of application server instances 310A and 310B and primary database server instance 312A for client instance 308, and data center 306B acts as a secondary data center to back up primary data center 306A for client instance 308. To back up primary data center 306A for client instance 308, secondary data center 306B includes a secondary pair of application server instances 310C and 310D and a secondary database server instance 312B. Primary database server instance 312A is able to replicate data to secondary database server instance 312B. As shown in FIG. 3, primary database server instance 312A replicates data to secondary database server instance 312B using a replication operation such as, for example, a Master-Master MySQL Binlog replication operation. The replication of data between data centers could be implemented in real time or by implementing full backup weekly and daily incremental backups in both data centers 306A and 306B. Having both a primary data center 306A and secondary data center 306B allows data traffic that typically travels to the primary data center 306A for client instance 308 to be diverted to secondary data center 306B during a failure and/or maintenance scenario. Using FIG. 3 as an example, if application server instances 310A and 310B and/or primary data server instance 312A fail and/or are under maintenance, data traffic for client instance 308 can be diverted to secondary application server instances 310C and 310D and secondary database server instance 312B for processing.

Although FIGS. 2 and 3 illustrate specific embodiments of cloud computing system 200 and multi-instance cloud architecture 300, respectively, the disclosure is not limited to the specific embodiments illustrated in FIGS. 2 and 3. For example, although FIG. 2 illustrates that cloud resources platform/network 210 is implemented using data centers, other embodiments of the cloud resources platform/network 210 are not limited to data centers and can utilize other types of remote network infrastructures. Moreover, other embodiments of the present disclosure may combine one or more different server instances into a single server instance. Using FIG. 3 as an example, application server instances 310 and database server instances 312 can be combined into a single server instance. The use and discussion of FIGS. 1-3 are only exemplary to facilitate ease of description and explanation.

Figure 4:
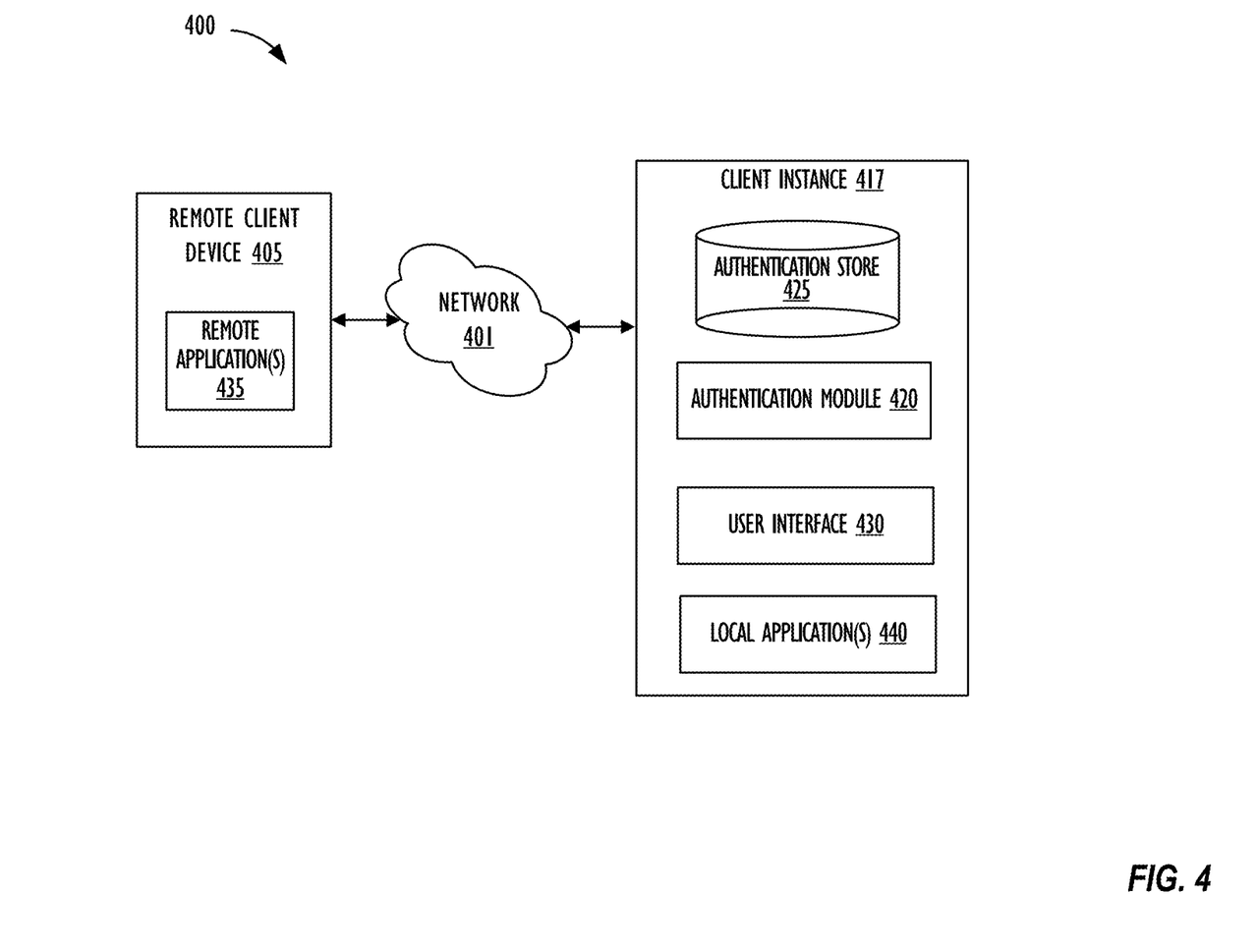
FIG. 4 illustrates a network infrastructure 400 where one or more embodiments of the present disclosure may operate.

FIG. 4 illustrates a block diagram of a basic network infrastructure 400 for providing authentication for a remote application, according to one or more embodiments. As shown in FIG. 4, network infrastructure 400 may include remote client device 405 and platform 410 that are communicatively coupled to each other through network 401. Remote client device 405 may be substantially similar to any of client devices 104, as described in FIG. 1, or client devices 204 of FIG. 2. Network 401 may be substantially similar to any of client network 102 and network 108, as described in FIG. 1, or client network 202 and network 208 of FIG. 2. Detailed description of remote client device 405 and network 401 is omitted here Platform 410 may be substantially similar to any of local compute resource 106 and server instance 114, as described in FIG. 1, and application server instances 310A-310D, database server instances 312A and 312B, as described in FIG. 2. That is, platform 410 may correspond to a cloud-based server of cloud computing infrastructure 200, as described in FIG. 2. Although the various components are described as located in particular locations and with particular functionality, in one or more embodiments, the various modules may be differently located. Further, the functionality may be differently distributed across the network infrastructure 400 or in different locations not shown.

Platform 410 may include a client instance 417. Client instance 417 may be substantially similar to client instance 308, as described in FIG. 3. Client instance 417 may act as a hosted client instance platform for deploying various enterprise and/or IT related software applications and related enterprise data on a live database. Client instance 415 may be hosted on any of data server computers 110, as described in FIG. 1, and cloud resources platform/network 210, as described in FIG. 2, and may be accessible by a user of remote client device 405 via network 401 through an application interface such as, for example, a graphical user interface (GUI) or a web browser executing on remote client device 405, in order to access software applications, services, and data deployed on client instance 417. Client instance 417 may include a user interface 430, such as an interface that allows a user to utilize one or more capabilities in areas of the enterprise such as IT, IT support, security, customer service, technical support, e-mail, backup and storage, HR, finance, legal, marketing, sales, compliance, and governance. The various capabilities may be provided in the form of local applications 440 (local to the client instance 417) hosted by the client instance 417. According to one or more embodiments, a user may gain access to the various local application(s) 440 and other resources of the client instance 417 by logging into or otherwise being authenticated by the client instance 417. For example, a user may enter a user name and password, provide identifying biometric information, or the like. In one or more embodiments, a user may be required to use a combination of authentication methods in the form of a multi-factor authentication method.

Client instance 417 may also include an authentication module 420 and an authentication store 425. Authentication module 420 may provide authentication information for users of the client instance 417 to facilitate access with the remote applications hosted by the remote device 405. According to one or more embodiments, the authentication module 420 may act as an API and provide functionality between the user interface 430 of the client instance 417, and the remote application(s) 435 hosted by the remote client device 405. According to one or more embodiments, the authentication module 420 receives a request to provide access to the remote application(s) 435, from within the client instance 417. For example, a user may submit a request through the user interface 430 of client instance 417. The authentication module 420 may generate a nonce value in response to the request and link it to the user account with which access to the client instance 417 was obtained. The authentication module 420 may provide the nonce code to the remote application(s) 435 such that the authentication module 420 may determine whether access is allowable when it receives the nonce code back from the remote application(s) 435.

In one or more embodiments, the authentication store 425 may include an authentication table that tracks authentication information utilized by the authentication module 425 to provide access to the remote application(s) 435. As an example, the authentication table may include data that indicates whether access is allowable to a particular requesting remote application 435, or from which an access determination may be derived. The authentication table may include an association between user information, generated nonce values, applications for which the nonce values are described, and the like. In addition, the authentication table may indicate whether a particular nonce value is valid, or whether or how many times a nonce value has been used for authenticating access to the remote application for which the nonce value was generated. Although the authentication module 420 and authentication store 425 are presented as part of a client instance 417, in one or more embodiments, authentication module 420 and authentication store 425 may be located in an alternative location, for example, among cloud resources 210 of FIG. 2. That is, the authentication module 420 and authentication store 425 may be hosted on a server, such as any of data server computers 110, as described in FIG. 1, and cloud resources platform/network 210, as described in FIG. 2. In an embodiment in which the authentication module 420 and/or the authentication store 425 are hosted in an alternate location, additional components may be utilized to communicate between the client instance 417 and the authentication module 420 and/or the authentication store 425. For example, an additional API may be utilized from the client instance 417 to communicate with the authentication module 420 providing the authentication service on behalf of the service instance 417 for the remote application(s) 435.

Remote client device 405 may be communicatively connected to platform 410 over network 401. According to one or more embodiments, remote client device 405 may belong to or be associated with a particular enterprise serviced by client instance 417 on platform 410. In one or more embodiments, a user associated with the enterprise may interact with the enterprise through user interface 430 of client instance 417, for example, in order to access local application(s) 440. According to one or more embodiments, a user of client instance 417 may wish to access remote application(s) 435, hosted by remote client device 405, from within client instance 417. In one or more embodiments, the remote application(s) 435 may require authentication of the user prior to allowing the user to access the applications. Thus, in one or more embodiments, the system allows a user that has been authenticated for the client instance 417 to utilize that authentication to access the remote application(s) 435. The remote application(s) 435 may provide coverage in one or more capability areas of the enterprise such as IT, IT support, security, customer service, technical support, e-mail, backup and storage, HR, finance, legal, marketing, sales, compliance, and governance. For example, the software applications may include components related to the following applications and modules utilized by the enterprise: IT Service Management, Incident Management, Problem Management, Change and Release Management, Benchmarks, Cost Management, Request Management, Configuration Management Database, Asset Management, Service Catalog, Knowledge Management, Survey and Assessment, Service Level Management, IT Operations Management, Discovery, Cloud Management, Event Management, Orchestration, Service Mapping, Operational Intelligence, IT Business Management, Project Portfolio Management, Demand Management, Resource Management, Agile Development, Application Portfolio Management, Cost Transparency, Financial Planning, Financial Reporting, Performance Analytics, Software Asset Management, Security, Security Operations, Governance, Risk and Compliance, Customer Service, Customer Service Management, Field Service Management, Knowledge Management, HR Service Delivery, Case and Knowledge Management, Employee Service Center, Employee Onboarding and Transitions.

Figure 5:
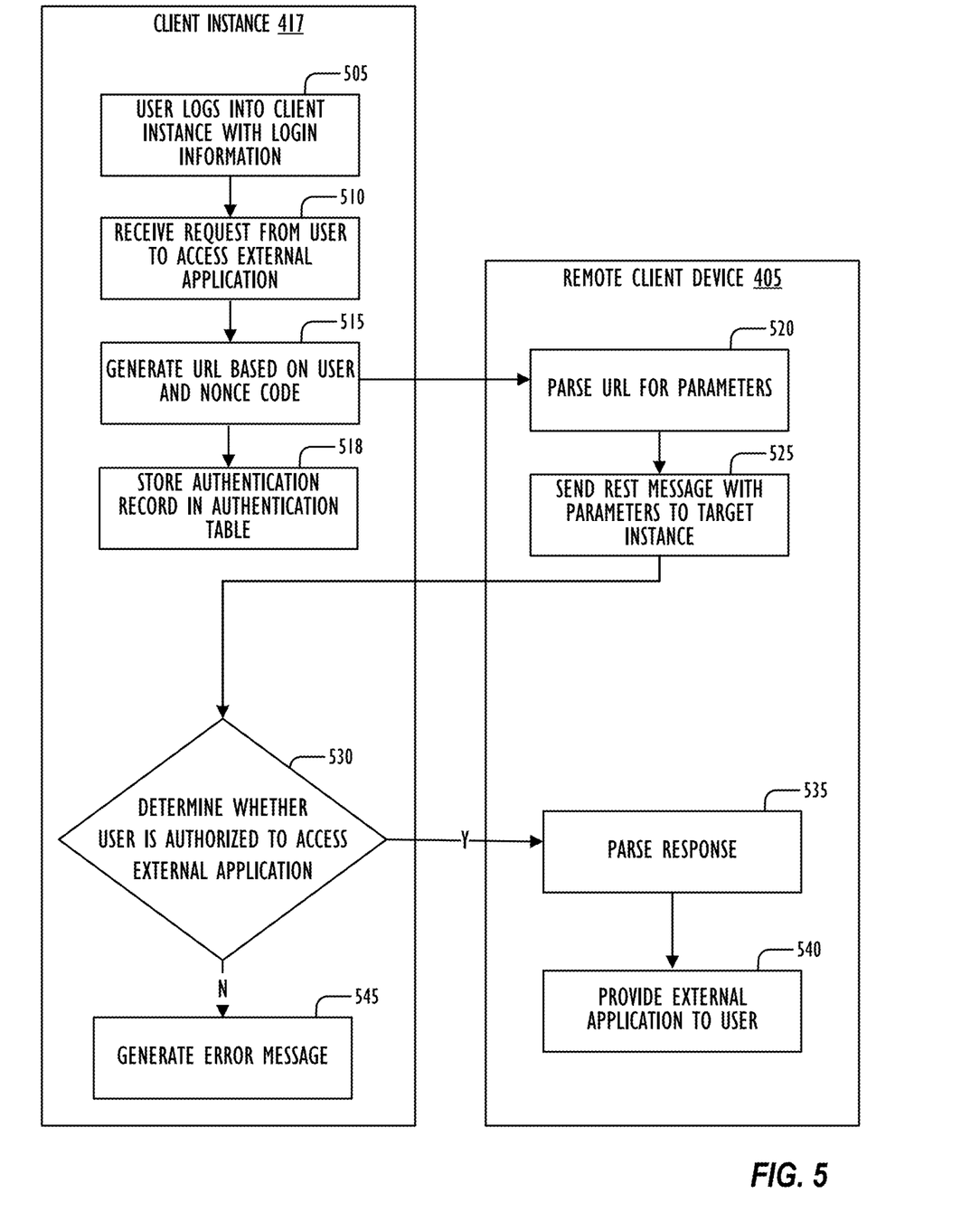
FIG. 5 shows a flowchart 500 illustrating operations of various components in the network infrastructure, according to one or more embodiments.

FIG. 5 shows a flowchart 500 illustrating operations of various components in the network infrastructure, according to one or more embodiments. The various operations are depicted as being performed by various components as described above with respect to FIG. 5. However, it should be understood that, according to one or more embodiments, one or more of the various processes depicted in FIG. 5 may be performed by alternative or additional components, such as those described above with respect to FIGS. 1-4. In addition, one or more of the various operations may be performed in a different order. Further, one or more operations may be omitted, and/or additional operations may be included in the flow, according to one or more embodiments.

The flowchart 500 begins at 505, where, at the client instance 417, a user logs into the client instance using login information. According to one or more embodiments, a user may initiate a session on client instance 417 by logging into the client instance 417 through user interface 430. As an example, the client instance 417 may receive a user name and password through the user interface 430, or any other kind of user credentials. As another example, the client instance 417 may receive biometric information from a user. Thus, login information may include textual data, biometric data, graphical data, audio data, or any other data that may be used to identify and/or authenticate a particular user for the client instance 117. According to one or more embodiments, the client instance 417 may include a local authentication module (not shown) that is utilized to determine whether a user is authorized to initiate a session on client instance 417 based on the provided login information.

The flowchart continues at 510, and the client instance 417 receives a request from the user to access an external application. Although not shown, a user may be authenticated at 505 prior to the flowchart 500 continues at 510. At 510, the request may be received by one or more methods of user input and/or automated processes. For example, according to one or more embodiments, user interface 430 may include an indication of external resources that require authentication, and are available from within the client instance 417. As an example, user interface 430 may include a list of available remote applications in the form of links to each remote application. As another example, the remote applications may be presented in the form of a dropdown menu. As another example, the user interface 430 may provide a search functionality that allows a user to enter a search query and, in response to receiving a search query, the user interface 430 may present one or more available remote applications. Then, the one or more remote applications may be presented to a user for selection. Thus, at 510, the client instance 417 may receive a request for access to a remote application by detecting a selection for a particular remote application of the remote application(s) 435.

At 515, the client instance 417 generates a URL based on the user and nonce code. For example, the authentication module 420 of the client instance 417 generates the URL based on the user and the nonce code. In one or more embodiments, the authentication module 420 may cause the URL to the external application to be provided in the form of a displayed link. The URL may be generated dynamically in response to detecting a request to access the external application, such as a user selecting a link that indicates a remote application, as described above. In one or more embodiments, the authentication module 420 may generate the nonce code by a random number generator, for example, a secure random number generator, such as a Java secure random number generator. Further, in one or more embodiments, the nonce code may be generated using a seed that is associated with the user, although a seed associated with the user may not be used with a secure random number generator in order to ensure the output sequence is cryptographically strong. The nonce code may be required to meet certain parameters. For example, in one or more embodiments, the nonce code may be at least 32 bytes long. The nonce code may be utilized to determine time parameters for which a user is authenticated. That is, the nonce code may be associated with expiration information that indicates a time period within which the nonce code must be used to access the remote application requested at 510. As an example, the nonce code may be configured to expire at most 3 hours after initiation. The expiration information may be configurable, and/or may be associated with a default value.

The URL may link the user information with the nonce code. As an example, the URL may include the nonce code along with a user identification value, such as a user_id or a sys_id. The identification data and nonce code may be appended to a URL to form a URL presented to a user. For example, the URL may be presented in the form https://portal.customer.com/index.php?user_id=10df58004f37&ncode=IFOTF9e15Fc5nDDX29. In one or more embodiments, the URL may be presented to the user for selection. The nonce code may include a random unique value that is generated at the time a remote application is selected from within the client instance 417.

According to one or more embodiments, the flowchart continues at 518, and the authentication module 420 stores the authentication information in an authentication table. In one or more embodiments, the flowchart may continue in response to detecting a selection of the link generated as described above with respect to 515. The authentication information may include the nonce code for the particular user and/or application. In one or more embodiments, the authentication table may additionally expiration information for the nonce code. That is, the nonce code may be associated with expiration information for access of the remote application specific to the user account. The expiration information may include, for example, a time stamp at the time of the origination of the nonce code. Expiration information may also include an expiration time, for example based on the time stamp. As described above, expiration information may be based on a default amount of time after the nonce code is generated. For example, each nonce code may be valid for three hours after it is generated. As another example, the expiration information may be specific to a particular user or application. As an example, a nonce code generated for a particular user may expire after a longer or shorter amount of time based on a characteristic or category of the user (e.g., a user with more system rights may be grated a loner expiration period, or a user with fewer system rights may be granted a shorter expiration period, and the like). As another example, the expiration information may be specific to an application, or a category of application (e.g., an application for which limited users are granted access may have a shorter expiration period than an application with more widely granted access, or an application that provides access to sensitive information may have a shorter expiration period than an application that provides access to public information).

Further, according to one or more embodiments, the authentication table may be used to track usage of the generated nonce codes, such as through a usage value. That is, according to one or more embodiments, the nonce codes may be configured to be single-use codes, such that once a user is authenticated to access a particular remote application, the nonce code used to provide that access will be invalidated such that it is no longer usable for accessing the particular remote application. In one or more embodiments, the authentication table may track whether a nonce code is used, and in some embodiments, may track a number of times the code is used, for example by a usage value in the authentication table. Thus, a nonce code may be determined to be invalid after a first use, or after some predetermined number of uses, which may be manually preselected, or may be configured based on a sensitivity level of an application and/or a user account for which the nonce code was generated.

Returning to 515, the flowchart continues at 520, where the remote client device parses the URL for various parameters. That is, the dynamically generated URL may be transmitted to the remote client device 405. In one or more embodiments, the URL may be presented for selection by a user. As described above, the URL may be used by the remote client device 405 to determine a user requesting access from the parameters. Further, the URL may also be used to determine the nonce value. As described above, according to one or more embodiments, the nonce value and a user identifier may be incorporated into the URL (e.g., a user_id or a sys_id), such as by being appended to the URL. In one or more embodiments, the URL may include or indicate additional parameters, such as an indicator for the application associated with the authentication information. According to one or more embodiments, in response to determining that the dynamically generated URL has been utilized to access the remote application, the client instance 417 may indicate that the nonce code, and/or the authentication record associated with the nonce code, is invalid in the authentication table.

At 525, the remote client device 405 sends a representational state transfer ("REST") message with the parameters back to the client instance 417. According to one or more embodiments, client instance 417 may require an identity provider ("IdP") certificate for the platform, for example during a TLS (transport layer security) handshake between the remote client device 405 and client instance 417.

The flowchart continues at 530 and the client instance 517 makes a determination as to whether the user is authorized to access the external application. The determination may be made based on the nonce value associated with the user. For example, the client instance 517 may access the authentication information in the authentication table. An authentication module may look up an authentication record for an access request, which may include an indication of the user along with the nonce value. The authentication record may include additional information to determine whether the access is authorized. For example, the authentication record may indicate expiration information, such as an origination time for the nonce value (e.g., a time at which the nonce value was generated), and/or an expiration time for the nonce value (e.g., a time at which the nonce value expires, and/or a time span from the origination time that indicates a time at which the nonce value expires). Determining whether the user is authorized to access the external application may be based on a comparison of the authentication record to an authentication profile. The authentication module 420 may determine whether the received nonce value, received in the REST message from the remote client device 405, is associated with the requesting party, which may also be received as one of the parameters in the REST message from remote client device 405. Further, validation of the requested access to the external application may be based on predetermined factors, such as a determination that the nonce value has not expired based on time-based expiration information (e.g., origination time and/or expiration time). In one or more embodiments, the validation may alternatively, or additionally, be based on usage information for the nonce value. For example, if the authentication record in the authentication table for the nonce value indicates that the nonce value has been utilized to access the external application, either at all or a threshold number of times, then the authorization may fail. If a determination is made at 530, that the user is not authorized to access the external application, then the flowchart 500 continues at 545, and the authentication module 420 generates an error message. For example, a visual and/or textual notification may be generated and presented to a user to indicate that the request for access has failed or was denied.

Returning to 530, if a determination is made that the user is authorized to access the external application, then the flowchart 500 continues at 535 and a response is sent to the remote client device 405. The response may be limited to information indicating that the requesting user account is validated to access the remote application. The response is parsed at 535. For example, the response may include information identifying the user such that the external application may be provided for the requesting user account. Based on the parsed response, the flowchart concludes at 540 where the remote client device 405 provides access to the external application to the user. For example, according to one or more embodiments, a window, such as a web browser, in which the client instance user interface is presented, may be redirected to the external application.

FIG. 6 shows an example authentication table 600, according to one or more embodiments. It should be understood that the authentication table 600 is presented merely for purposes of an example of one or more embodiments, and is not intended to limit the disclosure to the particular features presented and described with respect to authentication table 600. For example, in one or more embodiments, the authentication table may include additional values, or alternative values. Further, not all values described with respect to authentication table 600 may be necessary, according to one or more embodiments.

The authentication table 600 includes various authentication records, each associated with a request for access to a remote client device. In one or more embodiments, the authentication table may be specific to a particular customer, and/or remote application. In one or more embodiments, the authentication table 600 may be used to manage authentication records for multiple applications, and/or customers.

As shown, each authentication record (615, 625, 635, 645, 655) may include user identifying information, such as user_id 610. The authentication table may also track a particular external application 620 that the authentication record is related to, as well as the nonce value 630 generated in response to the request to access the remote application. The authentication table may include expiration information for the nonce value 630, such as an origination time 640, and an expiration time 650. In addition, according to one or more embodiments, the authentication table may include usage information 670 for the nonce value 630. The authentication table may also track the URL 660 dynamically generated in response to the request. Finally, according to one or more embodiment, the authentication table 600 may indicate a validity of the authentication record. That is, the validity 680 may indicate whether, based on an authentication profile, the authentication record is valid. For example, based on a current time and usage history of the authentication record.

The various authentication records shown provide various examples of valid and invalid authentication records. Beginning with authentication record 615, an authentication record is presented for User_A in response to request to access Application A. As shown, the example nonce value is ODX293Fc8. As shown, the nonce value was generated at 1:14:56, and expires at 4:14:56. For example, the nonce value may be granted, either by default or preconfigured, a three hour time span in which it is valid. The URL for authentication record 615 includes an indication of the user account "User_A", as well as the nonce value ODX293Fc8. As shown, the nonce value is shown to have already been used under usage 670, and the authentication record is shown to be invalid under validity status 680. According to one or more embodiments, the authentication record may be determined to be invalid based on the usage, or based on a current time, which may be past the expiration time.

Turning to authentication record 625, a second authentication record is presented for User_A in response to request to access Application B. As shown, the example nonce value is e15IF9c83. As shown, the nonce value was generated at 1:35:16, and expires at 4:35:16. For example, the nonce value may be granted, either by default or preconfigured, the three hour time span in which it is valid. The URL for authentication record 625 includes an indication of the user account "User_A", as well as the nonce value e15IF9c83. As shown, the nonce value is shown to have not yet been used under usage 670, and the authentication record is shown to be invalid under validity status 680. According to one or more embodiments, the authentication record may be determined to be invalid based on a current time, which may be past the expiration time.

Further, turning to authentication record 635, a third authentication record is presented for User_B in response to request to access Application C. As shown, the example nonce value is 933FXe2D8. As shown, the nonce value was generated at 2:15:36, and expires at 6:15:36. For example, the nonce value may be granted a four hour time span in which it is valid. The different expiration time may be assigned to the authentication record 635 based on a characteristic, such as a sensitivity level or a security level, associated with Application C and/or User_B. The URL for authentication record 635 includes an indication of the user account "User_B", as well as the nonce value 933FXe2D8. As shown, the nonce value is shown to have been used under usage 670, and the authentication record is shown to be invalid under validity status 680, for example because of the usage history.

Authentication record 645, shows another example authentication record. Authentication record 645 is depicted as being generated for User_C in response to request to access Application A. As shown, the example nonce value is f770bc10d. As shown, the nonce value was generated at 11:20:33, and expires at 14:20:33. Thus, the nonce value for authentication record 645 has the same default three hour time span as authentication record 615 which was also related to Application A. The URL for authentication record 645 includes an indication of the user account "User_A", as well as the nonce value f770bc10d. As shown, the nonce value is shown to have been used under usage 670, and the authentication record is shown to be invalid under validity status 680, for example because of the usage history.

Finally, authentication record 655, shows a fifth example authentication record. Authentication record 655 is depicted as being generated for User_D in response to request to access Application D. As shown, the example nonce value is 8004F3ec7. As shown, the nonce value was generated at 11:53:15, and expires at 14:53:15. The URL for authentication record 655 includes an indication of the user account "User_D", as well as the nonce value 8004F3ec7. As shown, the nonce value is shown to have not yet been used under usage 670, and the authentication record is shown to be valid under validity status 680, for example because of the usage history and a current time.

Figure 7:
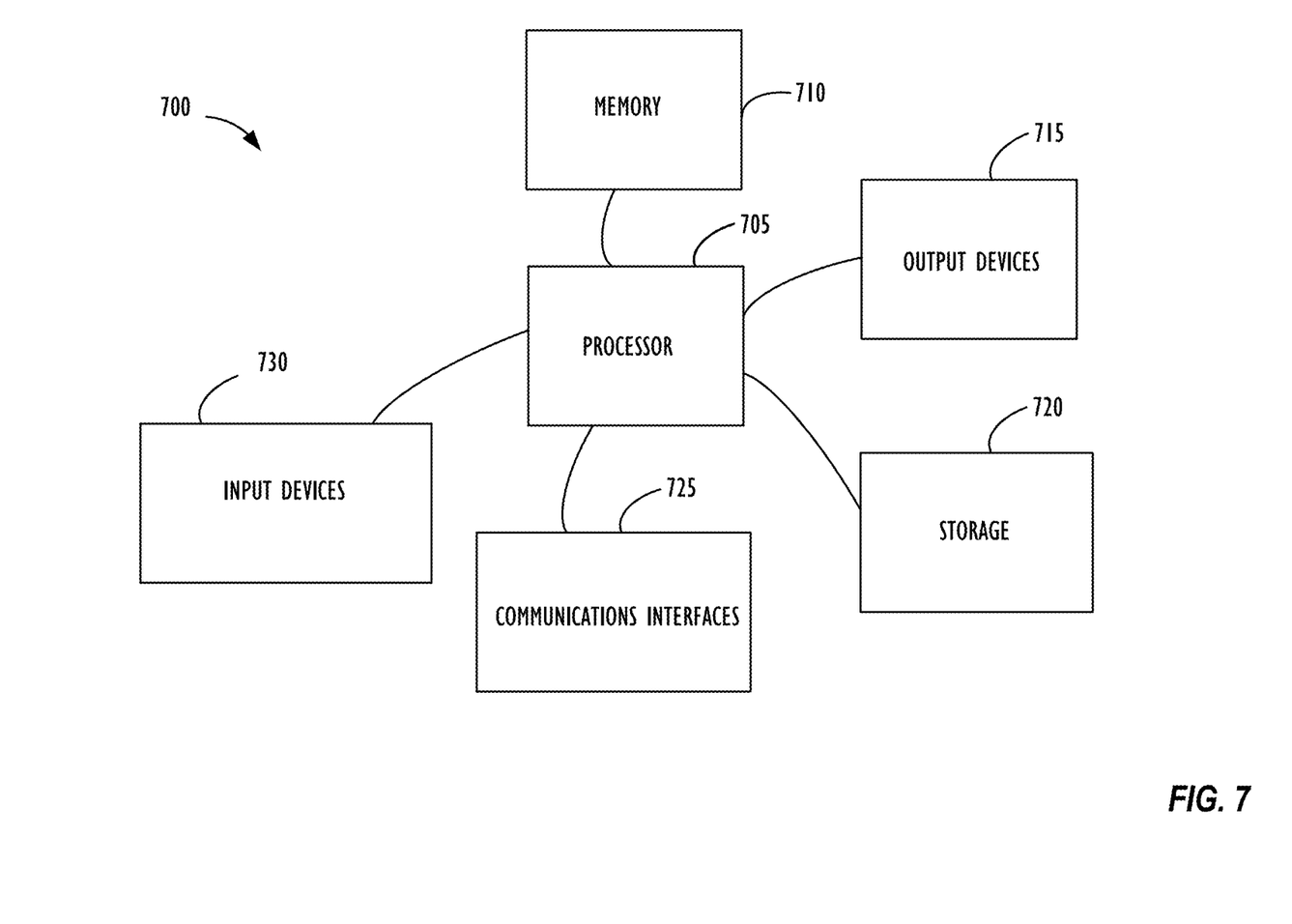
FIG. 7 illustrates a high-level block diagram 700 of a processing device (computing system) that may be used to implement one or more disclosed embodiments.

FIG. 7 illustrates a high-level block diagram 700 of a processing device (computing system) that may be used to implement one or more disclosed embodiments (e.g., data server computers 110, client computers 115, cloud resources platform/network 210, client devices 204A-204E, client instance 308, server instances 214, data centers 306A-306B, remote client device 405, client instance 417, etc.). For example, computing device 700 illustrated in FIG. 7 could represent a client device or a physical server device and include either hardware or virtual processor(s) depending on the level of abstraction of the computing device. In some examples (without abstraction) computing device 700 and its elements as shown in FIG. 7 each relate to physical hardware and in some examples one, more, or all of the elements could be implemented using emulators or virtual machines as levels of abstraction. In any case, no matter how many levels of abstraction away from the physical hardware, computing device 700 at its lowest level may be implemented on physical hardware. As also shown in FIG. 7, computing device 700 may include one or more input devices 730, such as a keyboard, mouse, touchpad, or sensor readout (e.g., biometric scanner) and one or more output devices 715, such as displays, speakers for audio, or printers. Some devices may be configured as input/output devices also (e.g., a network interface or touchscreen display). Computing device 700 may also include communications interfaces 725, such as a network communication unit that could include a wired communication component and/or a wireless communications component, which may be communicatively coupled to processor 705. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 7, processing device 700 includes a processing element such as processor 705 that contains one or more hardware processors, where each hardware processor may have a single or multiple processor cores. In one embodiment, the processor 705 may include at least one shared cache that stores data (e.g., computing instructions) that are utilized by one or more other components of processor 705. For example, the shared cache may be a locally cached data stored in a memory for faster access by components of the processing elements that make up processor 705. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) or a microprocessor. Although not illustrated in FIG. 7, the processing elements that make up processor 705 may also include one or more other types of hardware processing components, such as graphics processing units (GPUs), application specific integrated circuits (ASICs), field-programmable gate arrays (FPGAs), and/or digital signal processors (DSPs).

FIG. 7 illustrates that memory 710 may be operatively and communicatively coupled to processor 705. Memory 710 may be a non-transitory medium configured to store various types of data. For example, memory 710 may include one or more volatile devices such as random access memory (RAM). Non-volatile storage devices 720 can include one or more disk drives, optical drives, solid-state drives (SSDs), tap drives, flash memory, read only memory (ROM), and/or any other type memory designed to maintain data for a duration time after a power loss or shut down operation. In certain embodiments, the non-volatile storage devices 720 may be used to store overflow data if allocated RAM is not large enough to hold all working data. The non-volatile storage devices 720 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 705. In one embodiment, the compiling process of the software program may transform program code written in a programming language to another computer language such that the processor 1005 is able to execute the programming code. For example, the compiling process of the software program may generate an executable program that provides encoded instructions (e.g., machine code instructions) for processor 705 to accomplish specific, non-generic, particular computing functions.

After the compiling process, the encoded instructions may then be loaded as computer executable instructions or process steps to processor 705 from storage 720, from memory 710, and/or embedded within processor 705 (e.g., via a cache or on-board ROM). Processor 705 may be configured to execute the stored instructions or process steps in order to perform instructions or process steps to transform the computing device into a non-generic, particular, specially programmed machine or apparatus. Stored data, e.g., data stored by a storage device 720, may be accessed by processor 705 during the execution of computer executable instructions or process steps to instruct one or more components within the computing device 700.

A user interface (e.g., output devices 715 and input devices 730) can include a display, positional input device (such as a mouse, touchpad, touchscreen, or the like), keyboard, or other forms of user input and output devices. The user interface components may be communicatively coupled to processor 705. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 700 may comprise other components well known in the art, such as sensors, powers sources, and/or analog-to-digital converters, not explicitly shown in FIG. 7.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A non-transitory computer readable medium comprising computer readable code executable by one or more processors to:
   receive login credentials to access a client instance, wherein the login credentials are associated with a user account;
   cause the client instance to provide a link to an external application in the client instance;
   detect selection of the link in the client instance indicating a request to navigate to the external application;
   in response to detecting selection of the link, generate a nonce value for the user account and the external application;
   store, in an authentication table, an authentication record for the user account comprising the nonce value;
   generate a Uniform Resource Locator (URL) for the external application based on the authentication record;
   receive, from a remote client device hosting the external application, an authorization request comprising nonce information from the authentication record based on the URL;
   determine that the user account is authorized to access the external application based on the authentication record in the authentication table; and
   in response to determining that the user account is authorized to access the external application, provide access to the external application.

2. The computer readable medium of claim 1, wherein the authorization request comprises the nonce value.

3. The computer readable medium of claim 2, wherein the authentication record comprises expiration information for the nonce value.

4. The computer readable medium of claim 3, wherein the computer readable code to determine that the user account is authorized to access the external application comprises computer readable code to determine that the user account is authorized to access the external application based on the expiration information of the nonce value.

5. The computer readable medium of claim 2, wherein the computer readable code to provide access to the external application comprises computer readable code to indicate the authentication record is invalid in the authentication table in response to providing access to the external application.

6. The computer readable medium of claim 1, comprising computer readable code to generate an error message in response to determining that the user account is not authorized to access the external application.

7. The computer readable medium of claim 1, wherein the computer readable code to provide access to the external application comprises computer readable code to update a usage value in the authentication table in response to providing access to the external application.

8. A system comprising:
one or more hardware processors; and
a computer readable medium comprising computer readable code executable by the one or more hardware processors to:
receive login credentials to access a client instance, wherein the login credentials are associated with a user account;
cause the client instance to provide a link to an external application in the client instance;
detect selection of the link in the client instance indicating a request to navigate to the external application;
in response to detecting selection of the link, generate a nonce value for the user account and the external application;
store, in an authentication table, an authentication record for the user account comprising the nonce value;
generate a Uniform Resource Locator (URL) for the external application based on the authentication record;
receive, from a remote client device hosting the external application, an authorization request comprising nonce information from the authentication record based on the URL;
determine that the user account is authorized to access the external application based on the authentication record in the authentication table; and
in response to determining that the user account is authorized to access the external application, provide access to the external application.

9. The system of claim 8, wherein the authorization request comprises the nonce value.

10. The system of claim 9, wherein the authentication record comprises expiration information for the nonce value.

11. The system of claim 10, wherein the computer readable code to determine that the user account is authorized to access the external application comprises computer readable code to determine that the user account is authorized to access the external application based on the expiration information of the nonce value.

12. The system of claim 9, wherein the computer readable code to provide access to the external application comprises computer readable code to indicate the authentication record is invalid in the authentication table in response to providing access to the external application.

13. The system of claim 8, comprising computer readable code to generate an error message in response to determining that the user account is not authorized to access the external application.

14. The system of claim 8, wherein the computer readable code to provide access to the external application comprises computer readable code to update a usage value in the authentication table in response to providing access to the external application.

15. A method for providing access to an external application, via a hardware processor, comprising:
receiving login credentials to access a client instance, wherein the login credentials are associated with a user account;
causing the client instance to provide a link to an external application in the client instance;
detecting selection of the link in the client instance indicating a request to navigate to the external application;
generating a nonce value for the user account and the external application in response to detecting selection of the link;
storing, in an authentication table, an authentication record for the user account comprising the nonce value;
generating a Uniform Resource Locator (URL) for the external application based on the authentication record;
receiving, from a remote client device hosting the external application, an authorization request comprising nonce information from the authentication record based on the URL;
determining that the user account is authorized to access the external application based on the authentication record in the authentication table; and
providing access to the external application in response to determining that the user account is authorized to access the external application.

16. The method of claim 15, wherein the authorization request comprises the nonce value.

17. The method of claim 16, wherein the authentication record comprises expiration information for the nonce value, and wherein the determining that the user account is authorized to access the external application comprises determining that the user account is authorized to access the external application based on the expiration information of the nonce value.

18. The method of claim 16, wherein providing access to the external application comprises indicating the authentication record is invalid in the authentication table in response to providing access to the external application.

19. The method of claim 15, comprising generating an error message in response to determining that the user account is not authorized to access the external application.

20. The method of claim 15, wherein providing access to the external application comprises updating a usage value in the authentication table in response to providing access to the external application.

* * * * *